United States Patent [19]

Katoh et al.

[11] Patent Number: 4,776,024

[45] Date of Patent: Oct. 4, 1988

[54] SYSTEM FOR SEGMENTING CHARACTER COMPONENTS

[75] Inventors: Shin Katoh, Ohohashi; Hiroyasu Takahashi, Yokohama, both of Japan

[73] Assignee: International Business Machines Corporation, Armonk, N.Y.

[21] Appl. No.: 52,814

[22] Filed: May 21, 1987

[30] Foreign Application Priority Data

May 29, 1986 [JP] Japan ................................ 61-122414

[51] Int. Cl.$^4$ .............................................. G06K 9/34
[52] U.S. Cl. .......................................... 382/9; 382/18; 382/48
[58] Field of Search ......................... 382/9, 48, 51, 18

[56] References Cited

U.S. PATENT DOCUMENTS

| | | | |
|---|---|---|---|
| 3,432,673 | 3/1969 | Mader | 382/48 |
| 3,543,238 | 11/1970 | Schade | 382/48 |
| 3,629,826 | 12/1971 | Cutaia | 382/9 |
| 4,377,803 | 3/1983 | Lotspiech et al. | 382/9 |
| 4,466,121 | 8/1984 | Damen et al. | 382/9 |
| 4,527,283 | 7/1985 | Ito et al. | 382/48 |

OTHER PUBLICATIONS

Kim, "Baseline Drift Correction of Handwritten Test", *IBM Tech. Disc. Bulletin*, vol. 25, No. 10, Mar. 1983, pp. 5111–5114.

*Primary Examiner*—Leo H. Boudreau
*Assistant Examiner*—Joseph Mancuso
*Attorney, Agent, or Firm*—Thomas P. Dowd

[57] ABSTRACT

A system and method for electronically segmenting character components on character-containing documents involving first scanning a document and quantizing the image information obtained by the scanning into two levels, e.g., black and white, by 1 and 0 bits, and from the quantized information, m-bit OR groups are generated by sequentially ORing every m-th bit in a first direction of the quantized image, where m is an integer equal to or greater than two. The black (character) bits in each of the m-bit OR groups are counted and processed using the steps of: sequentially calculating sums of n consecutive count values by shifting one by one the count values obtained by the counting along a second direction perpendicular to the first direction; and then, segmenting character components by comparing the sums with a predetermined threshold value. The ORing operations can be performed conveniently by employing the OR instruction provided in a typical microprocessor and can attain substantially the same accuracy as conventional OCR systems employing an m×n mask.

16 Claims, 4 Drawing Sheets

SYSTEM FOR SEGMENTING CHARACTER COMPONENTS

BACKGROUND OF THE INVENTION

1. Field of the Invention

The present invention relates to a system for segmenting characters and character lines from a quantized image of a scanned document effectively and at a high speed in hardware structures having general purpose processors and memories.

2. Prior Art and Problems

In OCR systems for printed characters, it is often necessary to read a large amount of machine-printed characters. However, unlike hand-written slips wherein the characters are entered in predefined frames, printed documents, such as printed slips, may not be of such form that the characters are included regularly within character frames printed with a particular dropout color. In printed slips, the characters are usually printed according to the character pitches established uniquely in the printer by which the slip is printed. Further, slips to be read out by OCR systems include not only originally printed high-quality slips, but also copied slips. In such copied documents, since it is inevitable noise components will be included, it is desirable to detect only the effective character portions, which have not been affected by noises, in scanning their images.

In reading characters with OCR systems, besides the aforementioned problems there also exists the problem of document skewing. For example, in a document-feed-type scanner, skewing may be caused when a document is fed, and in a flat-bed-type scanner, a document may be skewed when placed on a reading platen. Further, in the case of a copied document, the document may have been copied with skewing.

Generally, conventional OCR systems employ a method of segmenting wherein first a line of character areas is segmented and then segmenting is carried out on each character area from the established line of character areas by projection or the like. However, if the document is skewed and the character line is not parallel to the projecting direction, the first segmentation of the character line is difficult. This problem could be resolved by a technique of dividing a character line into several blocks and projecting each of the blocks, such as described in Japanese Published Unexamined Patent Applications Nos. 58-106,665; 58-123,169; and 58-146,973, and in an article by J. Kim, "Baseline Drift Correction of Handwritten Text", IBM Technical Disclosure Bulletin. Vol. 25, No. 10, March 1983, pp. 5111-5114. However, this prior art literature mentions nothing concretely as to how small black portions, i.e., character components, are detected. Generally, any method of determining that a character component has been detected when a pattern includes only one black dot would probably be inadequate since it would be too sensitive to noises. On the other hand, another prior method often used in image processing, which employs a mask of 3×3 dots or so and determines that a character component has been detected when the number of black dots existing within the mask is more than a predetermined value, would require special circuits to implement it in this application, or its processing speed would be reduced if the equivalent functions were implemented with software since bit manipulations would be required.

In segmenting each character from an established character line, the problem of document skewing is not so difficult to overcome. However, for example, in the case of a laterally printed document, wherein the characters are more narrowly spaced from each other than the character lines, a forced segmentation should be made to avoid any connection between two adjacent characters due to noises existing therebetween, U.S. Pat. No. 3,629,826 to A. Cutaia et al discloses a method for separating such adjacent characters connected with or touching each other. According to this method, parameters representing leading stroke edges and lagging stroke edges are detected from quantized video information of the characters, the determined parameters are weighted, and then gating signals for separating adjacent characters are generated based on the differences between the weighted parameters. This method requires rather complicated hardware and software. Therefore, it is desirable to find a simpler method for segmenting characters.

Another common practice in segmenting characters and character lines has been to determine the spaces between character lines and the spaces between characters by preparing histograms of black dots and comparing them with predetermined threshold values. However, to prepare the histograms, it is necessary to add the number of black dots for the entire quantized image. This would generally impose a large overhead on a microprocessor. Hence, unless a dedicated circuit is provided therefor, the processing speed for performing all the segmentations would be reduced, and even if a dedicated circuit were provided, it would further add to the cost. Accordingly, it is the object of the present invention to provide a method for segmenting character components with simpler procedures and further without adding any special dedicated circuit.

SUMMARY OF THE INVENTION

The present invention provides a system and method for electronically segmenting character components on character-containing documents involving first scanning a document and quantizing the image information obtained by said scanning into two levels, e.g., black and white, by 1 and 0 bits. From the quantized information, m-bit OR groups are generated by sequentially ORing every m-th bit in a first direction of the quantized image, where m is an integer equal to or greater than two. The black (character) bits in each of said m-bit OR groups are counted and processed using the steps of: sequentially calculating sums of n consecutive count values by shifting one by one said count values obtained by said counting along a second direction perpendicular to said first direction; and then, segmenting character components by comparing said sums with a predetermined threshold value. The ORing operations can be performed conveniently by employing the OR instruction provided in a typical microprocessor and can attain substantially the same accuracy as conventional OCR systems employing an m x n mask.

DETAILED DESCRIPTION OF THE PREFERRED EMBODIMENT

In the following explanation of the preferred embodiments of the present invention, the description assumes that a laterally printed document is scanned such that the direction of character lines and the primary scanning direction of the scanner are the same. Further, the embodiments employ a blocking technique similar to that used in the above mentioned prior art, to deal with slanting character lines. However, it should be understood that the present invention may also be applied in the same way to cases where a vertically printed document is scanned or a blocking technique is not employed. The document may be either a machine-printed one or a hand-written one.

In principle, the present invention is similar to the conventional method wherein an m x n mask is shifted dot by dot laterally and vertically, respectively, and black dots existing within the mask are counted. It is then determined that an effective black component has been detected when the count value is equal to or greater than a predetermined value. However, the conventional method must operate the mask for all the dots, while the present invention can attain an efficiency equivalent to that attainable by shifting a mask merely by m or n dots and yet it achieves an accuracy in segmenting character components which is substantially the same as that which could be attained by shifting the mask dot by dot.

Figure 1:
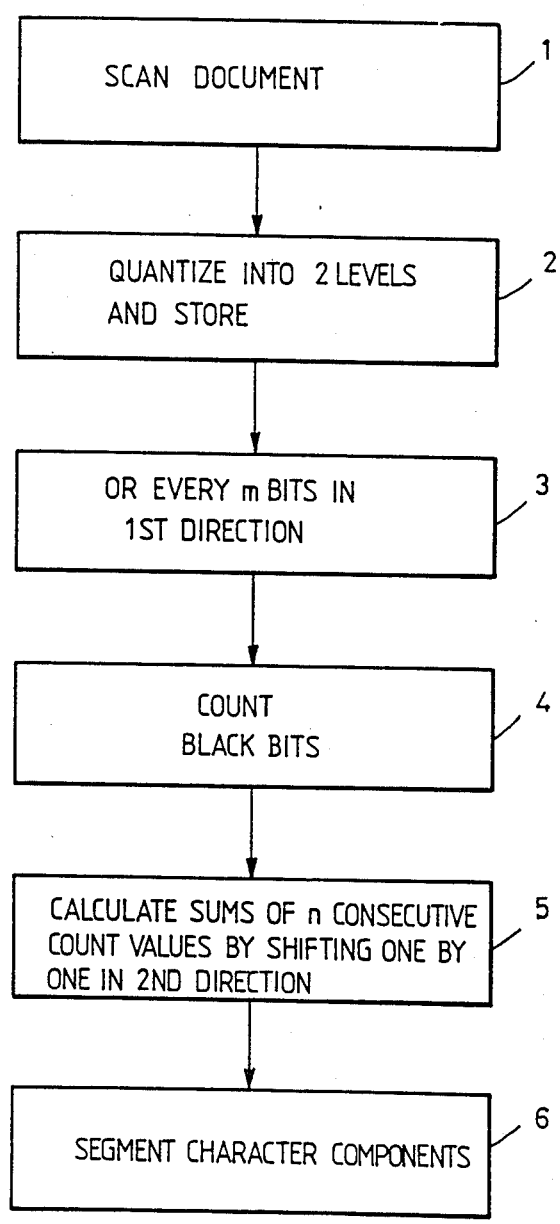
FIG. 1 is a flow chart of the method of the present invention.

FIG. 1 shows a flow chart of the method for segmenting character components according to the present invention. The initial steps, Step 1 of scanning a document with a scanner and Step 2 of quantizing the scanned information into two levels (representing each pixel with one bit) and storing it in an appropriate storage, are well known techniques and, therefore, need not be explained in greater detail here. In Step 3, m-bit OR groups are ultimately generated by sequentially ORing every m-th bit in a first direction of the quantized image, i.e., in the segmenting direction which is parallel to the lateral projecting direction. For example, in the case of the segmenting of a lateral character line, this may be accomplished by dividing each of the scanning lines in the quantized image into m-bit groups along the primary scanning direction (lateral direction) and ORing each of the m-bit groups in each of the scanning lines. However, as will be explained later, the OR operations may be performed more efficiently depending upon the architecture of the processor. The number of m-bit OR groups generated as the result of the OR operations in Step 3 is equal to the number of dots along a second direction of the quantized image, i.e., the direction perpendicular to the segmenting direction. In Step 4, black bits (e.g., binary '1') in each of these m-bit OR groups are counted. These count values are arranged along the second direction. In Step 5, the sums of n consecutive count values are sequentially calculated by shifting one by one the black-bit count values along the second direction. More specifically, first, the sum of the first through n-th count values along the second direction is calculated, and next, the sum of the second through (n+1)-th count values is calculated, and further operations are performed in the same way until the sum of the i-th through (n+i−1)-th count values is finally calculated. Step 5 is performed in order to discriminate between effective character components and noises, as will be explained later in more detail. In the final Step 6, character components are segmented by comparing each of the sums with a predetermined threshold value. Each of the values m and n is an integer equal to or greater than two. These values may be varied according to the resolution of a scanner or the unit of processing being used. Generally, they will be sufficient at three or four as in the case of a conventional mask.

Figure 2:
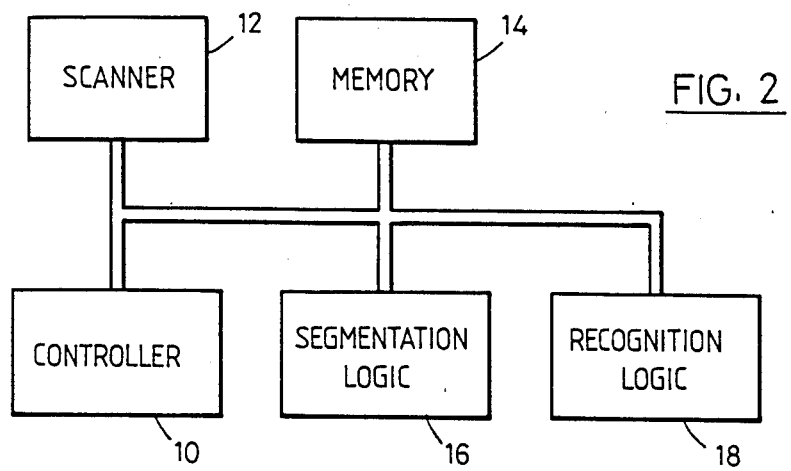
FIG. 2 is an example of a character recognition system for performing the method of the present invention.

The present invention may be applied using a character recognition system such as illustrated in FIG. 2. The system shown consists of: a controller 10 which controls the entire system; a scanner 12 which scans and quantizes into two levels a machine-printed or hand-written document; a memory 14 in which the quantized image from the scanner is stored; a segmentation logic 16 which scans the stored quantized image and segments character areas; and a recognition logic 18 which recognizes characters within the segmented character areas. In terms of particular hardware, the controller 10 may be a 16-bit microprocessor such as the Intel 8086, for example. The remaining elements of the system, other than the segmentation logic 16, may readily be assembled by one skilled in the art with well-known conventional components. In operation, to begin with, after storing the quantized image from the scanner 12 in the memory 14, the controller 10 activates the segmentation logic 16 to segment character lines and characters. In the present embodiment, since a 16-bit microprocessor is employed, it will be understood that the reading and writing operations out of and into the memory 14 are performed with units of 16-bit words. The segmentations of character lines and characters that are performed by the segmentation logic 16 under the control of the controller 10 is then carried out as follows.

Figure 3:
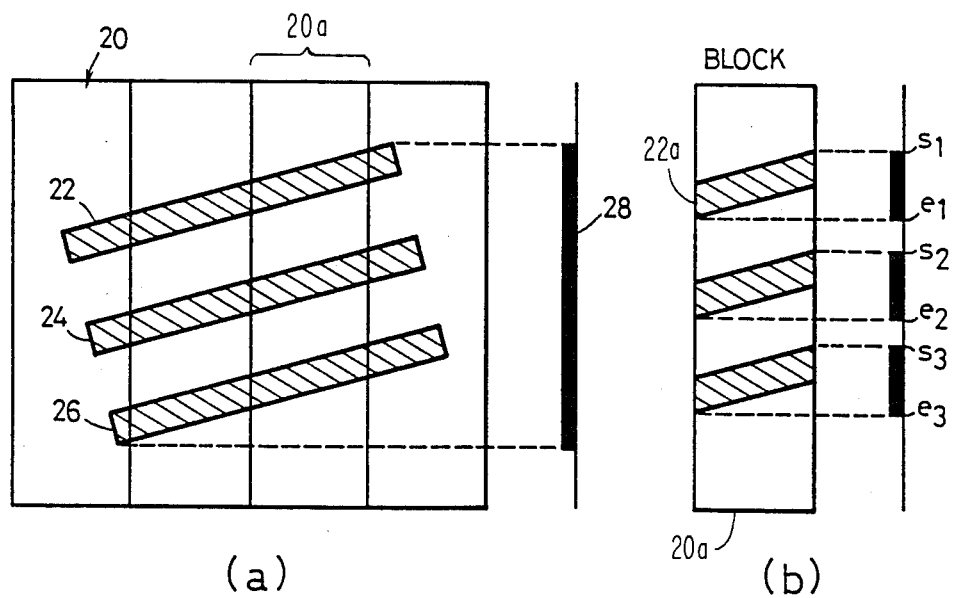
FIG. 3 illustrates a technique of blocking to be employed when a document is skewed.

The operation of segmenting character lines involves extracting each character line separately out of a quantized image read out by the scanner 12. Firstly, if a document including many character lines has been skewed when it is read by the scanner 12, the quantized image will be stored in the memory 14 in the skewed condition. When it is desired to segment each character line by laterally projecting such a quantized image, it will be difficult to segment the character lines because several adjacent character components may overlap each other. By way of explanation, an example is illustrated in FIG. 3 (a), wherein character lines 22, 24, and 26 are skewed in a quantized image 20 stored in the memory 14, so that their lateral projection shown by a solid line 28 on the right side will be detected as one character line. However, as already stated with reference to the prior art, this condition can be dealt with by equally dividing the image 20 into a plurality of blocks 20a (four, in the case of the example illustrated in FIG. 3 (a)) in the direction perpendicular to the projecting (lateral) direction, and projecting each of the blocks separately, whereby it is possible to extract each of the character line components successfully, as illustrated in FIG. 3 (b). In the present embodiment, such a blocking technique is employed. In the example illustrated in FIG. 3 (a), assuming that the image 20 has a width of 1728 bits (108 words), each block 20a has a width of 432 bits (27 words). Of course, such a blocking technique need not be employed when the problem of document skewing is not significant.

The quantized image from the scanner 12 is stored in the memory 14 sequentially word by word along the primary scanning direction of the scanner 12, and when image data in one line (108 words in the case of the above example) has been stored therein, image data in the next line, proceeding in the secondary scanning direction, is stored therein. When the entire quantized image has been stored in this manner, the segmentation logic 16 performs the segmentation of the character lines in each of the blocks 20a in accordance with the above-stated procedure of the present invention. This procedure is illustrated in FIGS. 4 and 5.

Figure 4:
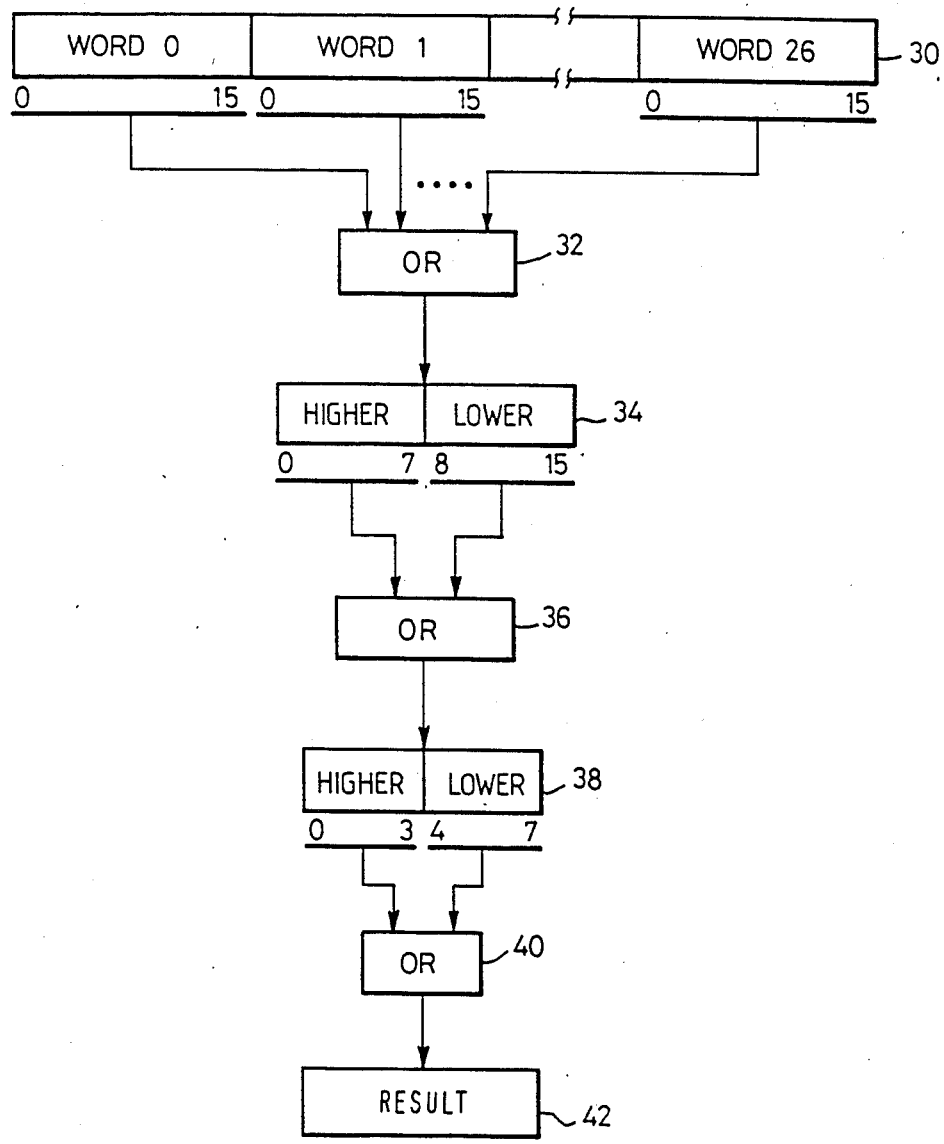
FIG. 4 illustrates the OR operations for segmenting character lines.
Figure 5:
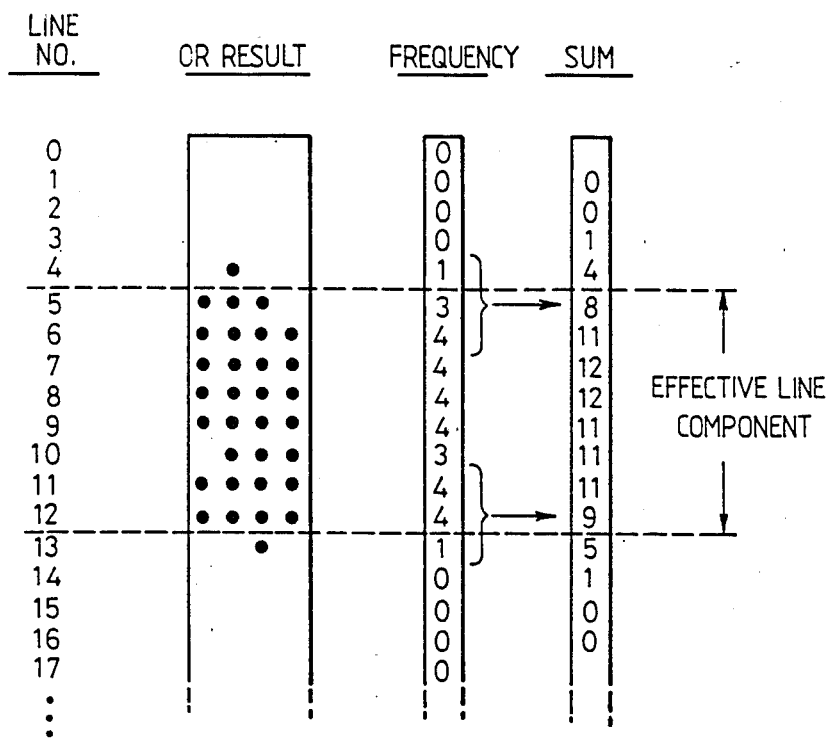
FIG. 5 illustrates a case where an effective line component is established from the OR results.

In FIG. 4, the data 30 contained in a particular line in one block, such as 22a shown in FIG. 3 (b), comprises 27 words (432 bits), in this embodiment. Thus, the width of each block is preferably an integral multiple of the width of a bus (16 bits in this case) of a microprocessor, and if otherwise, unnecessary bits should be masked. Heretofore, all the black bits in the line have been calculated, as has been explained above regarding the prior art, but this is inefficient for a microprocessor. Instead, in the present invention, each of m-bit groups (four bits per group in the case of the example illustrated in FIG. 4) is ORed. In this case, however, it would not be proper to OR every 4 bits in the line data with a 16-bit microprocessor. Therefore, in the example illustrated in FIG. 4, the first OR operation 32 is performed by dividing an OR result 34 into the higher byte and the lower byte, and the final OR operation 40 is performed by dividing an OR result 38 of one byte into the higher nibble and the lower nibble in the same way. Thus, an OR pattern 42 finally converged into 4 bits is obtained. Although the same result could be obtained by dividing the line data 30 into 4-bit groups and ORing each of them, the example illustrated in FIG. 4 would be more efficient. Generally, the method illustrated in FIG. 4 can be performed when $m=M/2^p$ (p is an integer), assuming that the unit of processing or the width of a bus is M bits. In other words, m can be selected to be so related.

The OR operations 32, 36, and 40 can be realized with the OR instruction in a microprocessor. In the first OR operation 32, the first operand may be a particular general-purpose register (initialized to all zero) and the second operand may be the addresses of the words 0-26 in the memory 14, and the results may be written back into the general purpose register of the first operand. Consequently, the OR result 34 of one line may be obtained by accessing the memory 14 twenty-seven times. If the general-purpose register can be accessed byte by byte, the OR result 34 of one word can easily be divided into the higher byte and the lower byte for ORing each of them. If the general purpose register cannot be accessed byte by byte, it would be necessary to divide the OR result 34 into the higher byte and the lower byte with the SHIFT instruction. The same may be said as to the case of obtaining the OR result 42 of four bits from the OR result 38 of one byte.

The operations illustrated in FIG. 4 are repeated for all the lines in the block. As a result 4-bit patterns as illustrated in the column headed "OR result" in FIG. 5 are obtained. By counting, directly or referring to a table, the number of black bits in each of the 4-bit patterns, the frequency of occurrence of black bits in the range of 0-4 is obtained. A method for detecting effective line components from the obtained frequencies of occurrence of black bits in accordance with the present invention will now be explained.

The shaded portions 22, 24, and 26 of image 20 illustrated in FIG. 3 are the portions to be segmented as character lines. These portions should naturally include a sufficient number of consecutive black bits. Therefore, it is estimated that the scanning lines which traverse the portions would have a frequency of occurrence of black bits of 4, respectively, and also that vertically consecutive scanning lines would have a frequency of occurrence of black bits of 4, respectively. On the other hand, in the case of noises which would occur sporadically, it is hardly likely that several consecutive scanning lines would have a frequency of occurrence of black bits of 4, respectively. Accordingly, by considering vertically the frequency distribution shown in the column headed "Frequency" in FIG. 5 and obtaining the sum of such frequencies in an area, it is possible to discriminate between effective character components and noises. More specifically, assuming that an area involved has a height n, the frequency values of n adjacent scanning lines are summed and this operation is repeated by shifting the scanning lines one by one. As a result, a series of sums as shown in the column headed "Sum" in FIG. 5 are obtained for the respective lines. In the example illustrated in FIG. 5, n=3. The sum of the frequencies for a line can be obtained by adding the frequency value of the line to the frequency values of the upper and lower lines adjacent thereto. However, in the case of a line 0 having no upper line, such an addition cannot be performed and the "Sum" column for the line 0 is shown with a blank (as is the bottom line). In such a case, if a virtual line having the frequency of 0 is established, it would be possible to perform such an addition.

The sums range from 0 to 12. The areas of effective line components can be detected by comparing these sums with a predetermined threshold value. In the present case, when the sum for a line is equal to or greater than the threshold value, it is determined that the line has black is equal to or greater than the threshold value, it is determined that the line has black components which constitute line components, and when the sum for the line is smaller than the threshold value, it is determined that the line does not have such black components. Further, when the "Sum" column is sequentially inspected from the top, the number of a scanning line of which the value has just changed from a magnitude smaller than the threshold value into a magnitude equal to or greater than the threshold value is registered as a character area starting point $s_i$, and the number of a scanning line of which the value is about to change from a magnitude equal to or greater than the threshold value into a magnitude smaller than the threshold value is registered as a character area ending point $e_1$ (see FIG. 3 (b)). In the example illustrated in FIG. 5, the threshold value is 7 and the line numbers 5 and 12 are registered as the character area starting point and the character area ending point, respectively. The number of lines (8 in this case) from the starting point to the ending point indicates the height of an effective line component. (Actually, in practice the height is typically much larger.)

The example illustrated in FIGS. 4 and 5, wherein m=4, n=3, and the threshold value=7, achieves substantially the same effect as that of the conventional method wherein an entire quantized image is scanned with a 3×4 mask and black components are detected by counting the number of black dots existing within the mask. However, the invention has the advantage that high speed processing is possible without requiring any dedicated hardware. Each of the values m, n, and the threshold value may be selected as desired according to the size of a font, the resolution of a scanner, the architecture of a microprocessor, etc. Each of the values m and n is an integer equal to or greater than two, although it would generally be sufficient to be no more than three or four. It is preferred that the threshold value be greater than a value (6 in the above example) at the middle of the range of the sums of the frequencies. The reason why m has been selected to be four rather than three in the above example is that the unit of processing is desired to be a power of two in a microprocessor, although m may be three if there is no such restriction.

Further, when a scanner having a high resolution on the order of 16 dots/mm is used, the sampling in the secondary scanning direction (vertical direction) may be performed every other scanning line since effective black components other than noises always extend over at least two scanning lines at such a high resolution, and the advantage of high speed processing in the present invention would be lost by performing the sampling every scanning line since the amount of image data would be increased thereby.

Although the segmentation of character components, i.e., character line components, according to the method illustrated in FIGS. 4 and 5 is satisfactorily accurate, the segmentation could be performed even more accurately by employing line pitch information and font size information provided by a system or a user in the case where an original document is a cmachine-printed one. For example, in FIG. 3(b), if ($e_1-s_1$) is within a predetermined range with respect to a font size (height), e.g., 0.8 to 1.2 times the font size, the portion bounded by $s_1$ and $e_1$ (shown with a thick line) can be established as a first line component. Next, by estimating the coordinates of the point where one line pitch is added to the coordinates of the center of the first line component, to be the center of a second line component, and by examining an area within the range in the order of 0.6 times the height of the font, for example, on the upper and lower sides of the estimated center of the second line component, then if the portion bounded by $S_i$ and $E_i$ ($i=2, 3, \ldots$) overlaps the area and, at the same time, ($e_1-s_1$) is within the range of 0.8 to 1.2 times the height of the font, the portion bounded by $s_1$ and $e_1$ can be established as the second line component. Thereafter, similar calculations are repeated until the last line component has been established. In the case where a quantized image is divided into a plurality of blocks, the same calculations are made for each of the blocks.

If ($e_1-s_1$) is greater than 1.2 times the height of the font, the block is to be subdivided further and the method illustrated in FIGS. 4 and 5 is to be performed again. If ($e_1-s_1$) is smaller than 0.8 times the height of the font, the differences between $e_i+1$, $e_i+2$, etc., and $s_i$ are examined, and when ($e_{i+1}-s_i$) is within the above range, the portion bounded by $s_i$ and $e_{1+j}$ is established as one line component. If the first line component could not be established, then the second line component is detected first by estimating the coordinates of point where one line pitch is added to point which is estimated as a part of the first line component, and then establishing these coordinates as the center of the second line component. Then the area where the first line component exists is calculated.

Theoretically, by rotating each character line component segmented according to the method illustrated in FIGS. 4 and 5 through 90°, and applying the method illustrated in FIGS. 4 and 5 thereto, a single character area could be segmented separately. However, rotating an image with an ordinary microprocessor would impose a large overhead to the microprocessor and reading of a quantized image stored in the memory 14 also in the vertical direction would require complicated access circuits. Therefore, a method which can be easily performed with an ordinary microprocessor will be explained below.

As explained before with respect to the principle of the present invention, the invention is based on ORing every m bits along the segmenting direction, i.e., the projecting direction. Accordingly, in segmenting characters, m corresponding bits in m consecutive scanning lines constitute one group. In the present embodiment, instead of reading such a group by one access from the memory 14 and ORing the group with each of the other groups, m registers, each having the same length as that of a previously segmented character line component, are provided or virtual areas for such registers are provided in the memory, and the result of ORing every m-th scanning line is stored therein. Then, finally, each group of m corresponding bits in the m registers would include the OR result as explained with respect to the principle of the present invention For example, assuming that the i-th to k-th scanning lines have been segmented as an effective line component according to the method illustrated in FIGS. 4 and 5, the following OR results would be stored in the the m registers $R_1$-$R_m$.

$$R_1 = [i] + [i+m] + [i+2m] + \ldots + [i+k_1m]$$

$(i+k_1m \leq k)$ $$R_2 = [i+1] + [i+1+m] + \ldots + [i+1+k_2m]$$

$(i+1+k_2m \leq k)$ $$R_m = [i+m-1] + [i+m-1+m] + \ldots + [i+m-1+k_mm]$$

$(i+m-1+k_mm \leq k)$

In the above formulas, each bracket [ ] represents the data of a scanning line having a number indicated therein (the length is the same as that of a segmented effective line component), and "+" represents the OR operation for each bit. These OR operations may easily be performed by employing the OR instruction with the first operand made to be each of the registers $R_1$-$R_m$, the second operand made to be the scanning line data, and the results made to be stored in the first operand register. In case the length of a segmented line component is more than one word (16 bits), the above operations are required to be performed for each word. Thereafter, as in the case of segmenting character lines, the number of black dots in the OR result along the segmenting direction (in this case, the secondary scanning direction) is counted and the frequency distribution in the direction perpendicular to the segmenting direction, i.e. the primary scanning direction, is obtained. Then the sums of n consecutive frequency values are calculated by shifting the frequency values one by one. When a sum of the frequency values is equal to or greater than a predetermined threshold value, the portion corresponding thereto is established as an area where a character component exists.

Figure 6:
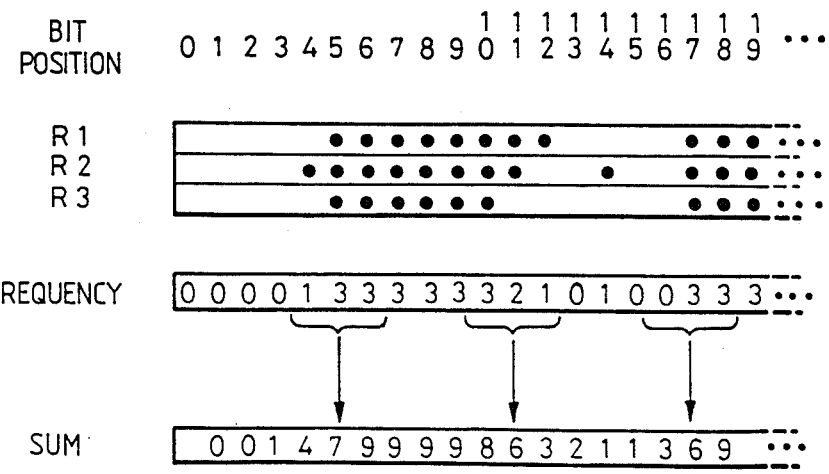
FIG. 6 illustrates a case where a character component is established in the same manner as in FIG. 5.

Each of the values m and n may generally be selected to be three since each of the effective character components, other than noises, generally includes at least three consecutive dots, although this depends upon the resolution of the scanner and the size of the font. In such casem the sums of the frequency values would range from 0 to 9, and accordingly, a threshold value may be selected to be five which is greater than the middle value. This method has substantially the same effect as in the conventional method wherein an entire quantized image is scanned dot by dot with a 3×3 mask. FIG. 6 illustrates an example of segmenting characters with each of the values m and n made to be three. The example illustrated in FIG. 6 corresponds to the example illustrated in FIG. 5 except that it is rotated 90° and the OR result consists of three bits. In the example illustrated in FIG. 6, it is established that the bit positions 5–11, 17, 18, etc., include effective character components.

Next, an explanation will be given as to a method of segmenting each character by employing pitch information and font size information (width) provided by a system or a user. First, the sums shown in FIG. 6 are checked sequentially from left to right as to whether or not each of them is equal to or greater than the threshold value 5. If the length of consecutive positions each having a sum equal to or greater than the threshold value is within the range of 0.8 to 1.2 times the width W of the font, for example, the positions are established as a first character area. With the coordinates of the center of the established character area in the X direction (the secondary scanning direction) denoted as $X_1$ and a character pitch denoted as P, the coordinates of the center $X_2$ of the next character in the X direction may be expressed as follows:

$$X_2 = X_1 + P$$

Accordingly, when a position having a sum of frequency values smaller than the threshold value (preferably, a position having a sum of the frequency values of zero) is detected within the following range:

$$X_2 + (P/2) \pm (P-W)/2$$

the position can be established to be the right edge of the estimated character frame of the next character. If such a position cannot be detected within the above range, it is considered that two adjacent characters touch each other. In such a case, the position at which the frequency distribution is the minimum within the estimated range can be selected as a point for segmentation. The left edge can be obtained in the same way. When the right and left edges of the estimated character frame have been determined (the upper and lower edges of a line area including the character have already been obtained at the time of segmenting the character line), the upper and lower edges of the character are detected by performing a lateral projection again within the range, to establish a rectangle circumscribed about the character. The coordinates of the center of the circumscribed rectangle in the X direction is newly defined to be $X_2$. By repeating the same process, each of the characters in each character line can be segmented. It will accordingly be seen that the present invention makes it possible to segment character components in a quantized image of a scanned document at a high speed and effectively by using an ordinary microprocessor.

Having thus described our invention, what we claim as new and desire to secure by Letters Patent is:

1. A method for segmenting character components in electronic images obtained from electronically scanning character-containing documents comprising the steps of:

quantizing image information, obtained by scanning an area of a character-containing document, into two levels, black and white, using 1 and 0 bits;

generating lines of m-bit OR groups from said quantized information by sequentially ORing every m-th bit with its following m-th bit in each line of bits in a first direction of the quantized image, where m is an integer equal to or greater than two;

counting the number of black bits in each of said m-bit OR groups and producing a set of count values based thereon arranged in accordance with said generated lines;

sequentially calculating sums of n consecutive count values, by shifting the count values obtained by said counting, along a second direction perpendicular to said first direction, and summing n values after each shift, where n is an integer equal to or greater than two; and segmenting character components by comparing said sums with a predetermined threshold value.

2. A method as in claim 1, wherein said m-bit OR groups are generated by the steps of:
 (a) generating M-bit OR groups by dividing the bits of said quantized image into M-bit groups along said first direction, where $M = 2^P m$ and p is an integer;
 (b) ORing each of said M-bit groups with its following M-bit group;
 (c) then generating M/2-bit OR groups by dividing each of said ORed M-bit groups into halves and ORing each of said halves; and
 (d) repeating said foregoing steps (a), (b), and (c) to ultimately generate said m-bit OR groups.

3. A method as in claim 2, wherein said first direction is the direction in which character lines are segmented.

4. A method as in claim 1, wherein a predetermined number of said m-bit OR groups are generated by dividing the bits of said quantized image into groups, each consisting of said predetermined number of bits along said second direction, and sequentially ORing every m-th group.

5. A method as in claim 1, wherein said first direction is the direction in which characters are segmented.

6. A method as in claim 1, wherein said shifting comprises shifting said count values one by one.

7. A method as in claim 1, wherein said steps are carried out using a microprocessor.

8. A method as in claim 1, wherein said ORing step comprises:
providing a set of m registers;
employing an OR instruction with the first operand made to be the respective contents of each of said registers and the second operand made to be the respective scanning line data; and
storing the ORed results respectively in said first operand registers.

9. A system for segmenting character components in electronic images obtained from electronically scanning character-containing documents comprising:

means for quantizing image information obtained by scanning an area of a character-containing document, into two levels, black and white, using 1 and 0 bits;

ORing means for generating lines of m-bit OR groups from said quantized information by sequentially ORing every m-th bit with its following m-th bit in each line of bits in a first direction of the quantized image, where m is an integer equal to or greater than two;

means for counting the number of black bits in each of said m-bit OR groups and producing a set of count values based thereon arranged in accordance with said generated lines;

means for sequentially calculating sums of n consecutive count values, by shifting the count values obtained by said counting, along a second direction perpendicular to said first direction, and summing n values after each shift, where n is an integer equal to or greater than two; and means for segmenting character components by comparing said sums with a predetermined threshold value.

10. A system as in claim 9, wherein said ORing means comprises;

(a) means for generating M-bit OR groups by dividing the bits of said quantized image into M-bit groups along said first direction, where $M=2^P m$ and p is an integer;

(b) means for ORing each of said M-bit groups with its following M-bit group;

(c) means for then generating M/2-bit OR groups by dividing each of said ORed M-bit groups into halves and ORing each of said halves; and (d) means for repeatedly actuating said foregoing (a), (b), and c) means to ultimately generate said m-bit OR groups.

11. A system as in claim 10, wherein said first direction is the direction in which character lines are segmented.

12. A system as in claim 9, wherein said ORing means comprises a microprocessor.

13. A system as in claim 9, wherein said ORing means comprises means for generating a predetermined number of said m-bit OR groups by dividing the bits of said quantized image into groups, each consisting of said predetermined number of bits along said second direction, and means for sequentially ORing every m-th group.

14. A system as in claim 9, wherein said first direction is the direction in which characters are segmented.

15. A system as in claim 9, wherein said calculating means comprises means for shifting said count values one by one.

16. A system as in claim 9, wherein said ORing means comprises:

a set of m registers;

microprocessor means for producing an OR instruction with the first operand made to be the respective contents of each of said registers and the second operand made to be the respective scanning line data; and means for storing the ORed results respectively in said first operand registers.

* * * * *